United States Patent [19]

Johansson

[11] Patent Number: 5,598,244
[45] Date of Patent: Jan. 28, 1997

[54] CAMERA MECHANISM DISPLACEMENT MEANS

[75] Inventor: Tomas Johansson, Falkenberg, Sweden

[73] Assignee: Victor Hasselblad AB, Sweden

[21] Appl. No.: 347,342

[22] PCT Filed: Jun. 3, 1993

[86] PCT No.: PCT/SE93/00493

§ 371 Date: Jan. 20, 1995

§ 102(e) Date: Jan. 20, 1995

[87] PCT Pub. No.: WO93/25935

PCT Pub. Date: Dec. 23, 1993

[30] Foreign Application Priority Data

Jun. 9, 1992 [SE] Sweden ............................ 9201751

[51] Int. Cl.⁶ ................................................. G03B 9/10
[52] U.S. Cl. .......................... 396/495; 396/496; 396/358
[58] Field of Search ................................... 354/152, 254, 354/255

[56] References Cited

U.S. PATENT DOCUMENTS 2,980,004  4/1961  Prentice .
3,096,700  7/1963  Willcox et al. .
3,470,808  10/1969 Bloemendaal et al. .
3,769,893  11/1973 Douglas .
3,819,258  6/1974  Butler et al. .
3,922,698  11/1975 Petersen .
4,091,399  5/1978  Ohmori .
4,172,648  10/1979 Daitoku .
4,235,534  11/1980 Beauviala .
4,245,897  1/1981  Beauviala et al. .
4,527,876  7/1985  Tanaka et al. .
4,697,896  10/1987 Fox .

FOREIGN PATENT DOCUMENTS

144602   9/1903  Germany .
3017893  11/1980 Germany .
2101755  1/1983  United Kingdom .
8103205  11/1981 WIPO .

Primary Examiner—David M. Gray
Attorney, Agent, or Firm—Lerner, David, Littenberg, Krumholz & Mentlik

[57] ABSTRACT

A camera is provided with means for effecting cyclic displacement of a mechanical system, such as a mirror mechanism (1) or shutter mechanism, between two end positions. The means include spring means (3) for biasing the system towards a neutral position or zone between the two end positions and drive means (5) for ensuring that the system sequentially reaches said end positions.

11 Claims, 7 Drawing Sheets

CAMERA MECHANISM DISPLACEMENT MEANS

FIELD OF THE INVENTION

The present invention relates to a camera, more particularly to means for effecting cyclic displacement of a mechanical system, such as a shutter mechanism, mirror mechanism, etc., in the camera, between two end positions. The invention further relates to a method for achieving cyclic displacement of a mechanical system, such as a mirror mechanism, shutter mechanism, etc., in a camera, between two end positions.

BACKGROUND OF THE INVENTION

Most cameras are provided with one or more mechanical systems which, during the sequence of taking a picture, are displaced from one end position to another, and thereafter returned to the first end position in readiness for the taking of a subsequent picture. Such systems include, for example, the viewing mirror mechanism of a single lens reflex camera, and/or the shutter mechanism and/or the diaphragm mechanism.

In terms of the viewing mirror mechanism, a common displacement means includes a return setting member, a mirror-up spring and an associated return spring, a latch and a mirror-up mechanism. A shutter charging operation energizes both the mirror-up spring and the return spring while bringing the return setting member to its set position where it is locked by the latch. A shutter release causes the mirror-up member to be initially actuated under the influence of the mirror-up spring to drive the mirror upward. Immediately after termination of shutter operation the return setting member is unlocked from the latch, thereby allowing the setting member to be returned under the influence of the return spring until the mirror returns to its original position.

The above-described mechanism suffers from many disadvantages. Firstly, to guarantee that the mirror will indeed reach its end positions, even if the camera in which it is fitted is operated in an inverted state, the two springs must be sufficiently tensioned to overcome mechanical losses so that the mirror arrives at the end positions with at least some tension remaining in the springs. This implies that the mirror is accelerated during its entire movement and therefore reaches its end positions at a maximum velocity for that movement. At the end positions the kinetic energy of the mirror and driving mechanism must be absorbed and, due to the relatively high velocity, the deceleration forces can be sufficiently high to cause shake of the camera, thereby giving rise to a blurred picture. The high velocity of the mirror also imposes problems with latching of the mirror at its end positions since the mirror can bounce back before the latch engages. The requisite high deceleration forces lead to increased noise levels and vibration whilst decreasing the life-span of the camera.

Many partial solutions to the above-described problem have been proposed. For example, in U.S. Pat. No. 4,192,598 a damping mechanism for reducing noise and shock is provided either on an element moving integrally with the mirror or on the driving lever. In U.S. Pat. No. 4,385,820 the mirror is raised and lowered by means of a gear train, one gear of which engages a sector-shaped gear integral with a mirror supporting member. Due to the weight of the mirror, large inertial forces have to be overcome and thus a greater driving force is necessary. In order to avoid bounce of the mirror at its end positions, U.S. Pat. No. 4,385,820 proposes a mechanical brake system for applying a braking force to the gear mechanism during the latter stages of the mirror's movement.

Whilst the systems described above may reduce the levels of noise and vibration, they also add to the complexity of the camera and occupy valuable space. In addition, the energy consumption of such systems is relatively high since, on the one hand, the relatively strong springs must be reenergized after each sequence and, on the other hand, not all of the energy in the springs is utilized.

A recent development in the field of mirror mechanisms makes use of a link mechanism driven by an electro-mechanical transducer, normally a d.c. motor. When a picture is to be taken, the motor is activated and the mirror is driven up to its end position. Thereafter the mirror is returned to its lower position by driving the motor with reversed polarity. In its simplest form even this type of mechanism needs some kind of braking or damping to avoid bounce. One possible, though not yet practicable, alternative could be to introduce intelligent control of the motor's torque to thereby control the acceleration and velocity of the mirror according to predetermined patterns. This alternative does however require advanced and fast-acting electronics, together with a quantity of cabling, sensors, printed circuit space, etc.

Another proposed solution is to use a first pre-energized spring to drive the mirror mechanism from its first end position towards the other end position. At the end of the movement the mirror mechanism is braked by a second spring. The energy from the braking is stored in the second spring and is used to accelerate the mirror mechanism during the beginning of its return movement. At the end of the return movement the mirror mechanism is braked by the first spring. This braking operation returns the first spring to the pre-energized state. An example of such a mirror mechanism is disclosed in U.S. Pat. No. 4,091,399. The mechanism can also be used for camera shutters, see U.S. Pat. Nos. 3,470,808 and 2,980,004.

However, in order to operate satisfactorily, these mechanisms require additional energy to overcome, for example, frictional losses. In the mechanisms referred to, the additional energy is supplied before the start of the movement. To guarantee that all mirror mechanisms will reach their end positions under all possible conditions, the amount of additional energy has to be set according to a "worst-case". This results in a waste of energy which is a disadvantage in camera systems with limited power resources.

As a new cycle of movement can not start until the additional energy has been supplied, the time required for the supply will severely limit the repetition frequency of the cycle of movement.

Another disadvantage of the proposed solution is that as the additional energy is constant, resulting in a variable operational time for the movement due to frictional variations, spring properties etc.

In terms of camera shutters, two main types are used, i.e. central (or sector) shutters and focal plane shutters. Focal plane shutters include both blade shutters and curtain shutters. These may be either spring-driven or motor driven. As with mirror mechanisms, a major problem lies with the adequate absorption of the kinetic energy of the shutter mechanism when approaching its end positions. Several partial solutions to this problem are proposed in the art, such as in GB-A-2 065 315, U.S. Pat. Nos. 4,829,329, 4,480,900 and 5,060,000, though all add to the complexity of the camera.

SUMMARY OF THE INVENTION

It is therefore an object of the present invention to provide a means for effecting cyclic displacement of a mechanical system, such as a mirror mechanism, shutter mechanism, etc., in a camera, between two end positions, which means avoids the risk of bounce, requires a minimal amount of energy and which is simpler than previous solutions.

This object is achieved in accordance with the present invention by means including spring means for biasing the system towards a neutral position or zone between said end positions, and drive means, activated during the displacement of the system, for ensuring that the system sequentially reaches said end positions.

It is a further object of the present invention to provide an improved method for achieving cyclic displacement of a mechanical system, such as a mirror mechanism, shutter mechanism, etc., in a camera, between two end positions.

This object is achieved in accordance with the present invention by a method which is characterized by the following steps:

i) biasing the system towards a neutral position or zone between said end positions;

ii) retaining said system at one of said two end positions;

iii) releasing said system from said one end position;

iv) providing an additional force to said system above that due to said biasing to ensure that the system reaches the other of said two end positions;

v) retaining said system at said other end position;

vi) releasing said system from said other end position; and vii) providing an additional force to said system above that due to said biasing to ensure that said system reaches said one end position.

Since the system is biased towards a neutral position or zone between the end positions, the maximum velocity of the component occurs at this neutral position or zone during movement from one end position to the other. Similarly, the velocity of the system, and therefore its kinetic energy, tends to zero when approaching the end positions. As such, no complicated braking or damping system is necessitated and latching is simplified. It will be apparent that the drive means is required essentially merely to compensate for frictional losses and changes of potential energy in the system, so that its power output can thus be relatively low and adapted to the prevalent conditions.

Further advantageous embodiments of the present invention are detailed in the dependent claims.

BRIEF DESCRIPTION OF THE DRAWINGS

The present invention will be described in more detail in the following, by way of example only, and with reference to the attached drawings in which.

DETAILED DESCRIPTION OF THE PREFERRED EMBODIMENT

In FIGS. 1 to 4 a mirror mechanism is shown in which a mirror denoted by reference numeral 1 is pivotably attached to a not shown camera chassis by means of a link arrangement 2. Means 3 are provided for displacing the mirror between two end positions, as will be explained in the following.

Figure 1A:
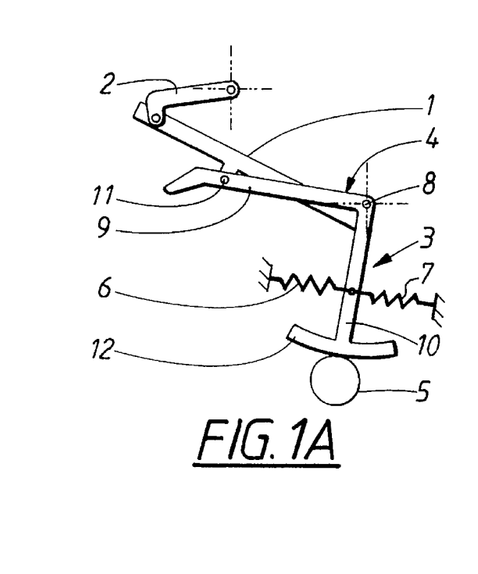
FIGS. 1A to 1C schematically illustrate a first embodiment of the invention in three different positions of the system being displaced.
Figure 1B:
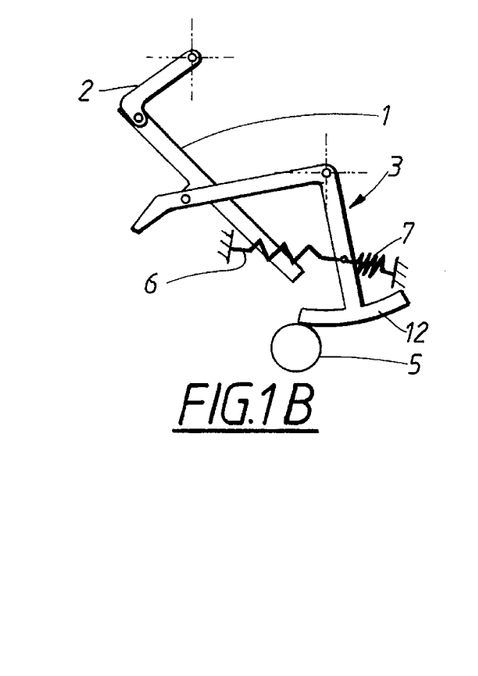
Figure 1C:
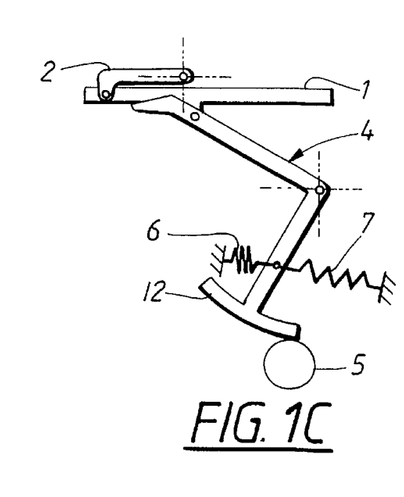

In FIG. 1A the means 3 for displacing the mirror 1 includes a driving lever 4 acted upon by drive means comprising a motor 5, and spring means comprising two opposed spring members 6 and 7. One end of each spring member is affixed to the camera chassis whilst the other end is attached to the driving lever 4. Whilst two spring members are shown in FIGS. 1A to 1C, it will be apparent that a single spring member may also be used, with its mid-point being attached to the driving lever 4. The driving lever 4 is pivotably supported by the camera chassis at a point 8 which coincides with the intersection of two branch arms 9, 10 making up the driving lever 4 to impart a substantially L-shape to the driving lever. The remote end of one branch arm 9 is pivotably attached to the mirror at a point 11, whilst the remote end of the other branch arm 10 is provided with an arcuate gear rack 12. The gear rack 12 is intended to cooperate with the motor 5. In FIG. 1A the mechanism is shown in a so-called neutral position at which the forces in the spring members 6, 7 are balanced, i.e. the mirror 1 is biased towards this neutral position. As will become clear from the following description of the sequence of operation of the mechanism, in normal operation the mirror I is never stationary in the neutral position.

FIG. 1B shows the mechanism in its first end position, or viewing position, in which the mirror subtends an angle of preferably 45° to the light from an object which is to be photographed. Light from the object is reflected by the mirror toward a view finder optical system (not shown). In the viewing position the spring member 6 is in tension whilst the spring member 7 is in compression. Due to the angle subtended by the mirror 1, the motor 5 engages the arcuate gear rack 12 of the driving lever 4 at one end thereof. The mirror is retained in this position by a not shown latch means acting either on the mirror itself or on a part making up the drive means 3. Upon depression of the shutter button (not shown), the latch means is released and the mirror 1 is accelerated towards its neutral position by the action of the spring members 6, 7. Simultaneously, or with slight delay, the motor 5 is activated to increase the acceleration of the mirror. Once the mirror 1 has passed the neutral position, the spring members 6, 7 impose a braking force on the mirror 1 by absorbing the kinetic energy of the mirror mechanism. This stored energy can then be used in subsequent operational cycles.

In FIG. 1C the mirror has reached its second end position, corresponding to the exposure position, at which the mirror is maintained substantially parallel to the light from the object to be photographed by a not shown latch means. In this position the spring member 6 is in compression whilst the spring member 7 is in tension. The motor 5 meanwhile engages the arcuate gear rack 12 of the driving lever 4 at its other end. Once exposure is completed, the latch means releases the mirror which is then accelerated towards the neutral position by means of the spring members and an impulse of energy from the motor 5. Once the mirror has passed the neutral position, the spring members 6, 7 again impose a braking force on the mirror 1 by absorbing the kinetic energy of the mirror mechanism so that the mirror reaches its end position with minimal velocity. The mirror is then latched at this end position in readiness for a subsequent cycle of operation.

Figure 2A:
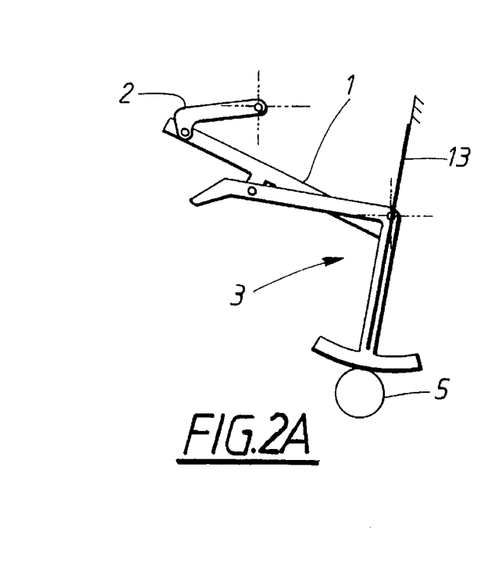
FIGS. 2A to 2C schematically illustrate a second embodiment of the invention in three different positions of the system being displaced.
Figure 2B:
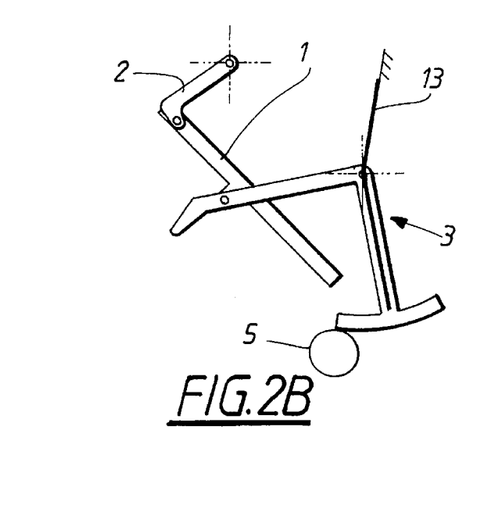
Figure 2C:
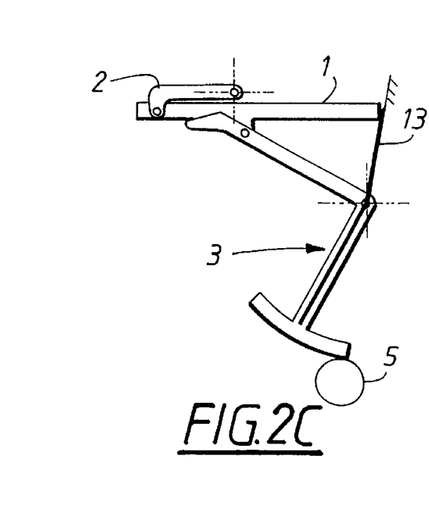

The mechanism shown in FIGS. 2A to 2C corresponds in the main to that shown in FIGS. 1A to 1C, though with the exception that the two spring members 6, 7 of FIG. 1 have been replaced by a single spring member 13 in the form of a leaf spring. As shown in FIG. 2A, the leaf spring 13 is biased towards a neutral position which corresponds to a position between the two end positions illustrated in FIGS. 2B and 2C respectively. Apart from the different type of spring means, the function and operation of the mechanism according to FIG. 2 is identical to that of FIG. 1.

From the above description of the mechanisms according to FIGS. 1 and 2 it will be apparent that the motor 5 serves merely to overcome frictional forces and to contribute potential energy to the mechanism in the cases where the centre of gravity of the mechanism is to be raised. To ensure reliable functioning of the camera under all foreseeable conditions, the motor 5 should be sufficiently powerful to be able to displace the mechanism from the neutral position to either of the end positions. Such a case could arise whereby the mirror is accidentally unlatched and the motor is not energized, e.g. if the camera should be severely jolted.

Figure 3A:
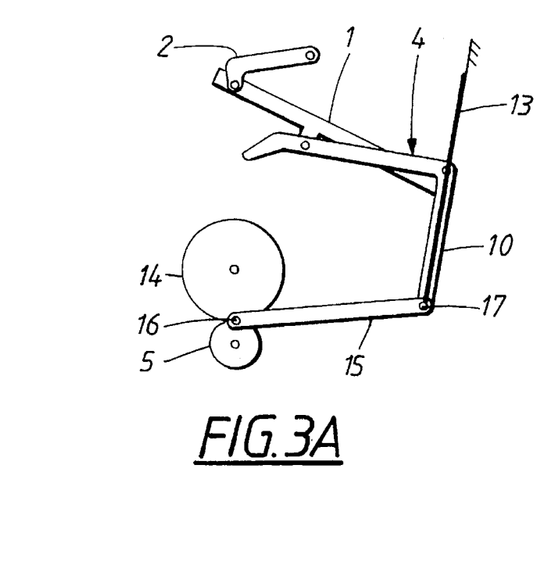
FIGS. 3A to 3C schematically illustrate a third embodiment of the invention in three different positions of the system being displaced.
Figure 3B:
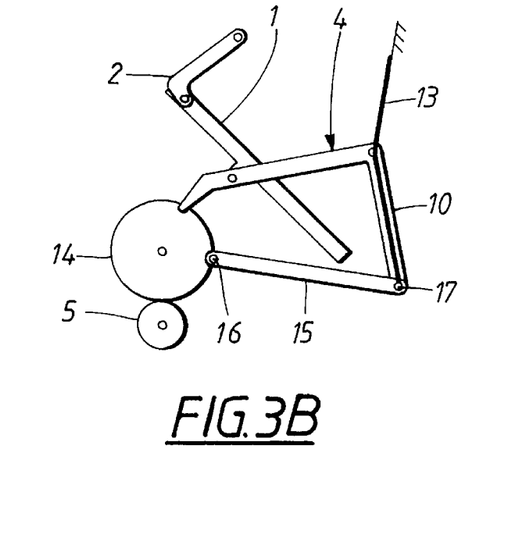
Figure 3C:
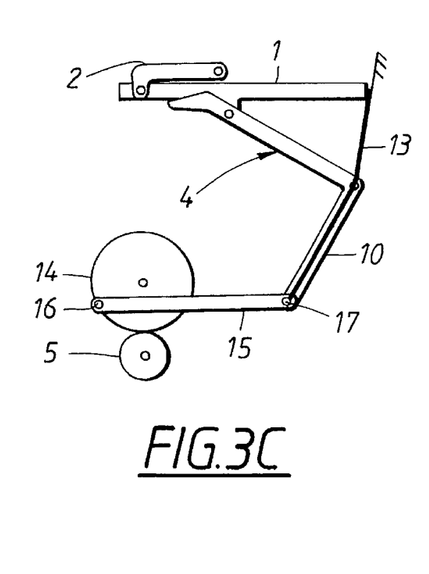

In order to reduce the torque requirements of the motor 5, a reduction gear system may be incorporated between the motor and the driving lever 4, as shown in FIGS. 3A to 3C. In these figures, the motor 5 acts on a reduction gear wheel 14 to which a link arm 15 is pivotably connected to a point 16 near the circumference of the gear wheel 14. The link arm 15 is pivotably connected to the driving lever 4 at a point 17 at the remote end of the branch arm 10. The link arm 15 serves to convert the arcuate displacement of the point 16 on the gear wheel 14 into a linear displacement of the point 17 on the driving lever 4. In FIG. 3A the mechanism is shown in its neutral position to which it is biased by a leaf spring 13. The relative dimensions of the gear wheels in the reduction gear system are selected such that in the neutral position the position of the point 17 on the link arm 14 relative to the gear wheel 14 lies between the end positions of the point as shown in FIGS. 3B and 3C, in which FIG. 3B corresponds to the viewing position and FIG. 3C to the exposure position. Apart from the addition of the reduction gear system and link arm 15, the function and operation of the mechanism according to FIG. 3 is identical to that of FIGS. 1 and 2.

Figure 4A:
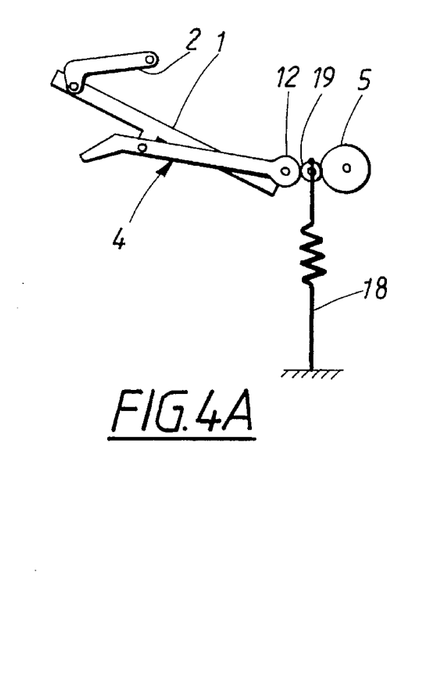
FIGS. 4A to 4C schematically illustrate a fourth embodiment of the invention in three different positions of the system being displaced.
Figure 4B:
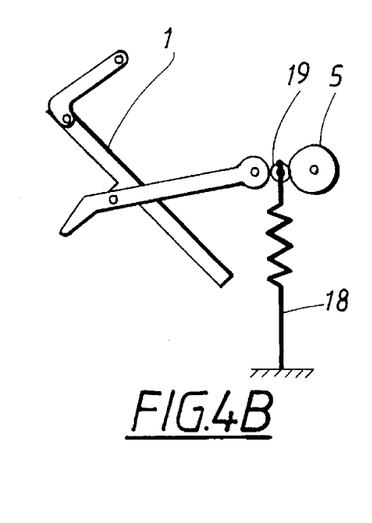
Figure 4C:
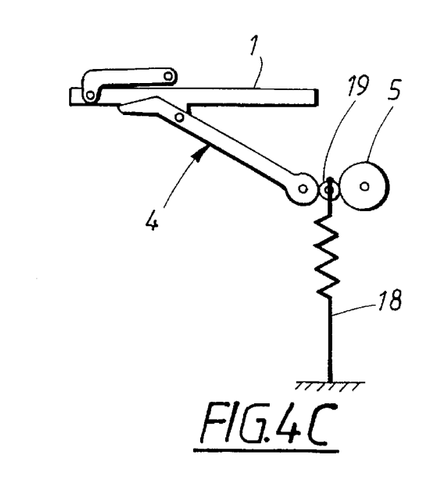

Instead of using two opposing spring members or a leaf spring, a tension spring (or even a compression spring) may be used which is affixed at one end to the camera chassis and at the other to a gear wheel driven by the motor. One possible arrangement is schematically illustrated in FIGS. 4A to 4C in which a tension spring 18 is connected to an idler gear 19 which transmits the rotational motion of the motor 5 to the driving arm 4 which is provided with an arcuate gear rack 12. In FIG. 4A the mechanism is in its neutral position with the spring 18 in its least tensioned state. FIG. 4B shows the mechanism in its viewing position, whilst FIG. 4C shows the mechanism in the exposure position. From these figures it will be apparent that displacement of the mirror 1 from the neutral position to the viewing position causes the extension of the spring 18 by rotation of the idler gear in one direction, whilst displacement of the mirror i from the neutral position to the exposure position causes the extension of the spring 18 by rotation of the idler gear in the other direction. In a preferred embodiment the spring/idler gear combination is arranged to provide a self-locking function at the end positions, i.e. the positions corresponding to FIGS. 4B and 4C, thereby dispensing with the need for latch means.

Figure 5A:
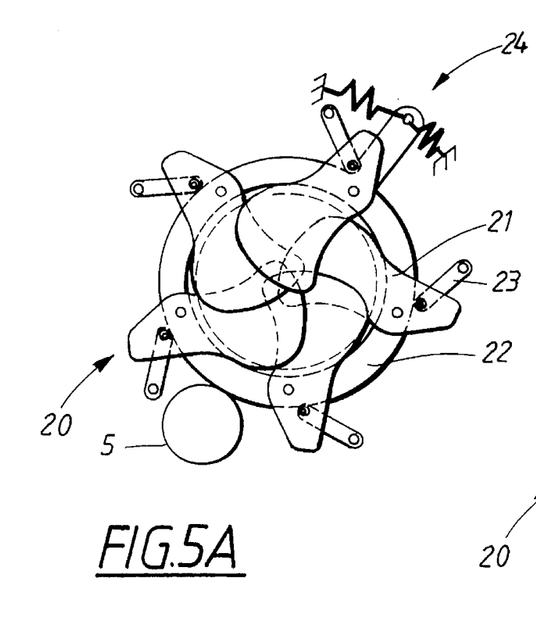
FIGS. 5A to 5C schematically illustrate a fifth embodiment of the invention in three different positions of the system being displaced.
Figure 5B:
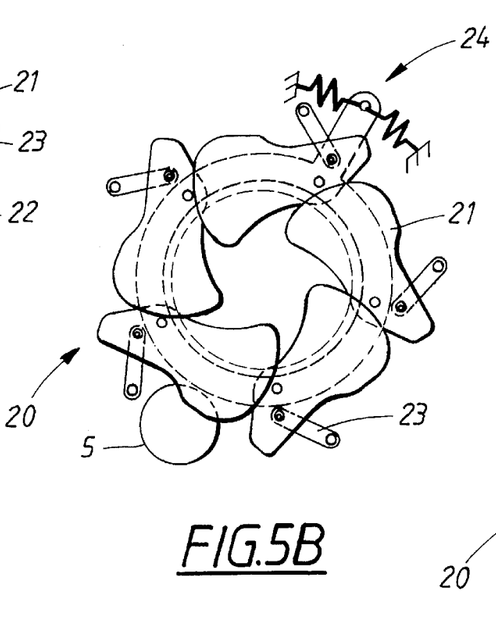
Figure 5C:
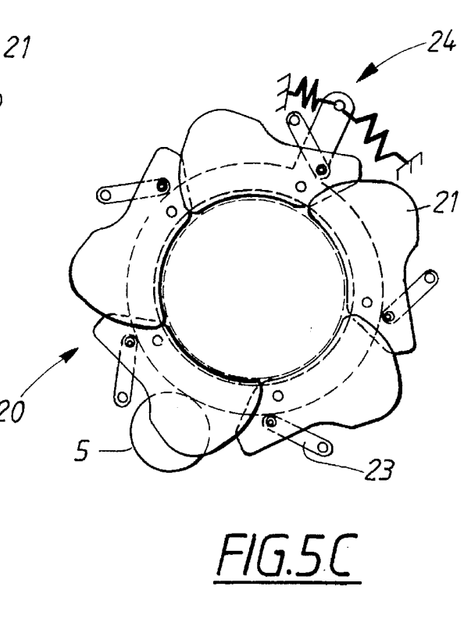
Figure 6A:
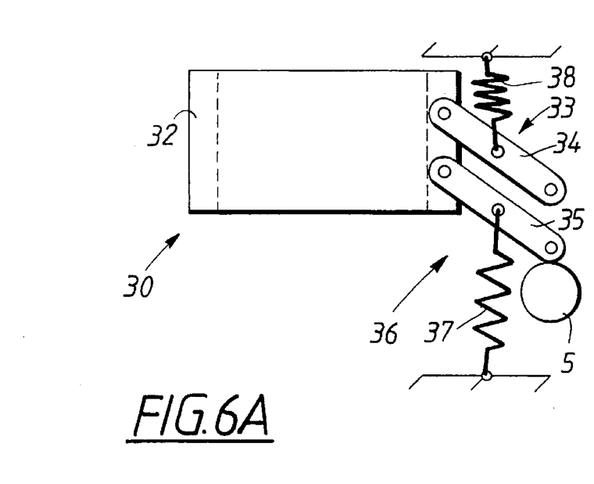
FIGS. 6A to 6C schematically illustrate a sixth embodiment of the invention in three different positions of the system being displaced.
Figure 6B:
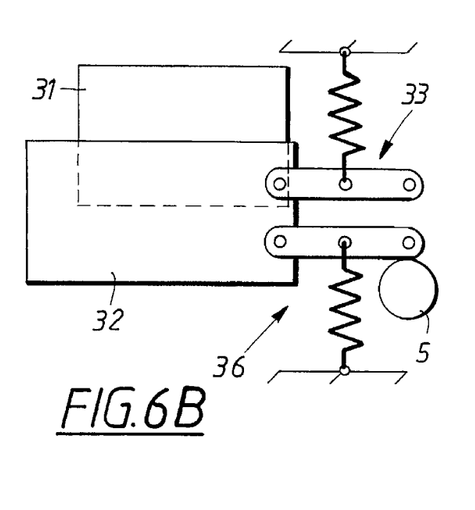
Figure 6C:
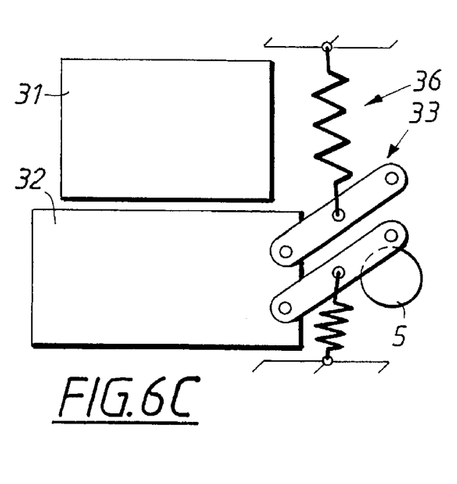
Figure 7A:
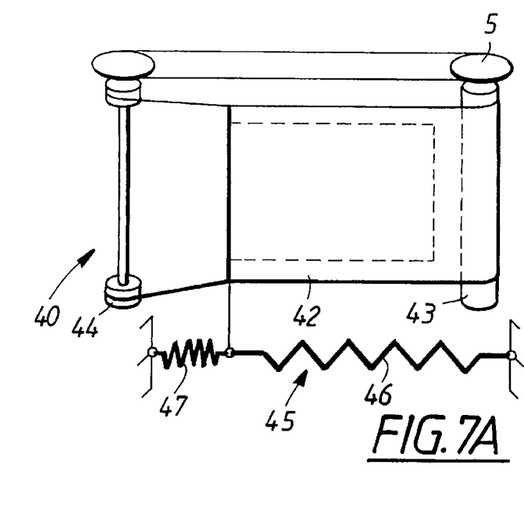
FIGS. 7A to 7C schematically illustrate a seventh embodiment of the invention in three different positions of the system being displaced.
Figure 7B:
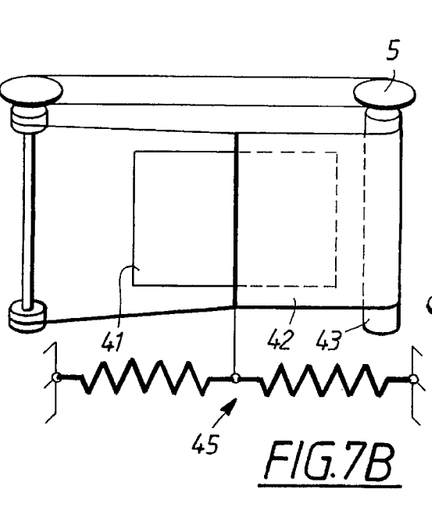
Figure 7C:
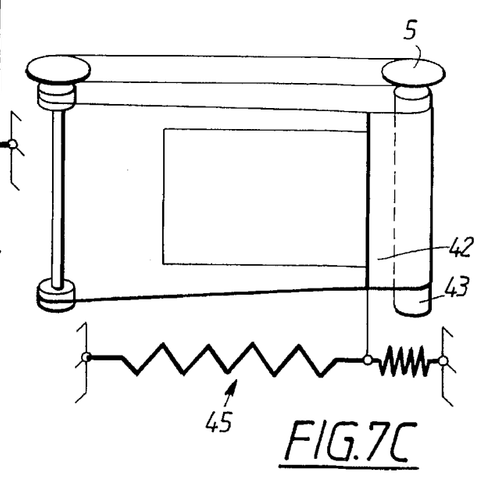

The principle of operation described above in connection with a camera mirror mechanism can also be applied to the shutter mechanisms of cameras, as illustrated in FIGS. 5 to 7. FIG. 5 illustrates a central shutter mechanism, FIG. 6 a blade shutter mechanism and FIG. 7 a curtain shutter mechanism. In FIGS. 5A, 6A and 7A the shutters are shown in a closed position, in FIGS. 5B, 6B and 7B the shutters are in a neutral position, whilst in FIGS. 5C, 6C and 7C the shutters are shown in a fully open position.

With reference to FIGS. 5A to 5C, a central shutter mechanism 20 is shown made up of a plurality of sectors 21. In a manner known per se each sector is pivotably affixed to a sector opening drive ring 22 and a pivot link 23, the remote end of which pivot link 23 is pivotably affixed to the camera or lens chassis. Spring means 24 are provided for biasing the shutter in the position shown in FIG. 5B. The spring means may be two spring members, a single leaf spring or a single tension spring. A drive means in the form of a motor 5 is arranged to impart rotational movement to the sector opening drive ring 22 either directly or via a system of reduction gears. In the position shown in FIG. 5A the shutter is closed and the sector opening drive ring 22 is held in the corresponding closed position against the action of the spring means 24 by a not shown latch means. When a picture is to be taken, the shutter button (not shown) is depressed and the latch means is released so that the sector opening drive ring 22 is accelerated towards its neutral position by the action of the spring means 24. Simultaneously, or with slight delay, the motor 5 is activated to increase the acceleration of the drive ring. Once the drive ring 22 has passed the neutral position, the spring means 24 imposes a braking force on the ring by absorbing the kinetic energy of the shutter mechanism. This stored energy can then be used in subsequent operational cycles.

In FIG. 5C the shutter mechanism is shown in its other end position, i.e. its open position, whereat it is maintained by not shown latch means. Once exposure is completed, the latch means releases the drive ring 22 which is then accelerated towards the neutral position by the spring means 24 and an impulse of energy from the motor 5. Once the drive ring has passed the neutral position, the spring means 24 again imposes a braking force on the drive ring 22 by absorbing the kinetic energy of the shutter mechanism so that the shutter reaches its end position with minimal velocity. The drive ring is then latched at this end position in readiness for a subsequent cycle of operation.

FIGS. 6A to 6C show a simplified blade-type shutter mechanism 30 for covering and uncovering an exposure aperture 31 in which just one blade 32 is illustrated. This contrasts to normal shutter mechanisms which have two blades or sets of blades, one for opening the aperture and the other for closing the aperture. Displacement of the blade 32 towards and away from the exposure aperture 31 is achieved by means of a parallel link arrangement 33 comprising two link arms 34 and 35. One end of each linkarm is pivotably affixed to the camera chassis whilst the other end of each arm is pivotably attached to the shutter blade 32. Spring means 36, in the shown example in the form of two opposed spring members 37 and 38, are provided for biasing the shutter blade 32 in the position shown in FIG. 6B. A drive means in the form of a motor 5 is arranged to impart rotational movement to the parallel link arrangement 33 either directly or via a system of reduction gears. In the position shown in FIG. 6A the shutter mechanism 30 is in its closed position and is maintained there against the action of the spring means 36 by a not shown latch means. When a picture is to be taken, the shutter button (not shown) is depressed and the latch means is released so that the shutter blade is accelerated towards its neutral position by the action of the spring means 36. Simultaneously, or with slight delay, the motor 5 is activated to increase the acceleration of the shutter blade. Once the shutter blade 32 has passed the neutral position, the spring means 36 imposes a braking force on the link arrangement 33 by absorbing the kinetic energy of the shutter mechanism. This stored energy can then be used in subsequent operational cycles.

In FIG. 6C the shutter blade 32 is shown in its other end position, i.e. its open position, whereat it is maintained by not shown latch means. Once exposure is completed, the exposure aperture 31 is covered by corresponding displacement of the previously mentioned blade for closing the aperture. The shutter blade 32 may thus be maintained in this open position or the latch means may be disengaged to release the blade 32 which is then accelerated towards the neutral position by the spring means 36 and an impulse from the motor 5. Once the shutter blade has passed the neutral position, the spring means 36 again imposes a braking force by absorbing the kinetic energy of the shutter mechanism so that the shutter blade 32 reaches its end, or initial, position with minimal velocity. The shutter blade or any suitable part of the link mechanism or drive means is then latched at this end position in readiness for a subsequent cycle of operation.

FIGS. 7A to 7C show a simplified curtain shutter arrangement, generally denoted by reference numeral 40, for covering and uncovering an exposure aperture 41. In the shown example just one curtain 42 is illustrated for the sake of clarity, though normally two overlapping curtains are employed, one on either side of the exposure aperture 41. Displacement of the curtain 42 towards and away from the exposure aperture 41 is achieved by means of a drive arrangement comprising a motor 5 driving two spools 43, 44 at opposite sides of the exposure aperture 41, around which spools the curtain 42 is wound and unwound. Spring means 45, in the shown example in the form of two opposed spring members 46 and 47, are provided for biasing the curtain 42 towards the position shown in FIG. 7B. In the position shown in FIG. 7A the curtain shutter arrangement 40 is in its closed position and is maintained there against the action of the spring means 45 by a not shown latch means. When a picture is to be taken, the shutter button (not shown) is depressed and the latch means is released so that the curtain 42 is accelerated towards its neutral position by the action of the spring means 45. Simultaneously, or with slight delay, the motor 5 is activated to increase the acceleration of the curtain. Once the curtain 42 has passed the neutral position, the spring means 45 imposes a braking force on the curtain by absorbing its the kinetic energy. This stored energy can then be used in subsequent operational cycles.

In FIG. 7C the curtain 42 is shown in its other end position, i.e. its open position, whereat it is maintained by not shown latch means. Once exposure is completed, the latch means releases the curtain 42 which is then accelerated towards the neutral position by the spring means 45 and an impulse of energy from the motor 5. Once the curtain has passed the neutral position, the spring means 45 again imposes a braking force by absorbing the kinetic energy of the curtain shutter arrangement so that the curtain 42 reaches its end position with minimal velocity. The curtain shutter mechanism or drive means is then latched at this end position in readiness for a subsequent cycle of operation.

Common to the embodiments according to the invention is the feature that additional energy is supplied to the system during the displacement between the end positions. This allows the additional energy to be controlled so that only the energy necessary to secure the safe arrival of the mirror mechanism to the end positions is supplied. By using the output from a positional or speed sensor (not shown) connected to the drive shaft of the motor 5, the camera μ-processor (not shown) can monitor the speed and position of the mechanism. When the processor finds that the relation between speed and position diverges from the expected, that is when the mechanism will not reach its end positions, the processor can instruct motor control circuits (not shown) to increase the power input to the motor, thus returning the movement of the mechanism to the expected. The control of the additional energy implies that only the exact amount of energy required in each operation is supplied. The power consumption of the mechanism is therefore kept to a minimum.

The control of the additional energy further implies that the operational time for the movement between the end positions is controlled thus compensating for time variations due to variable frictional losses or other mechanical properties. This feature is of special importance when the invention is applied to a camera shutter system.

It should be noted that the use of a electric motor for supplying the additional power simplifies the control system as one of the properties of electric motors is that they increase the output power when an increasing load tends to slow down the motor speed. To some extent an electric motor therefore automatically compensate for the mechanical variations earlier described.

The invention is not restricted to the embodiments described above or shown in the drawings, but may be varied within the scope of the appended claims. For example, the drive means 5 may be a d.c. electric motor, linear motor or mechanical means employing e.g. spring energy. Whilst the examples have been directed towards viewing mirrors and shutters, it is to be understood that the principles of the present invention may advantageously be applied to any camera system or optical viewing device. For example, the invention may also be applied to the aperture mechanism of a camera. Whilst the spring means have been described as biasing the mechanical system towards a neutral position, it is to be understood that the neutral position may in fact be a neutral zone between the end positions, such a neutral zone being defined as a zone in which the resultant force from the spring means on the mechanical system is zero. It is further to be understood that the impulse from the motor 5 may instead be applied to the mechanical system after the system has passed the neutral position or zone.

What is claimed is:

1. Means for effecting cyclic displacement of a mechanical system which is displaceable between a pair of end positions in a camera, said means comprising spring means for biasing said system towards a neutral position between said pair of end positions, and drive means actuatable to supply additional energy during said displacement of said system when said system is between said pair of end positions for insuring that said system sequentially reaches said pair of end positions.

2. Means according to claim 1, said means further comprising monitoring means for monitoring said displacement of said system between said pair of end positions, and control means for controlling said drive means in response to said monitoring means to ensure that said system sequentially reaches said pair of end positions.

3. Means according to claim 1 or 2, wherein said mechanical system includes a viewing mirror.

4. Means according to claim 1 or 2, wherein said mechanical system includes a shutter.

5. Means according to claim 1 or 2, in which said spring means comprises two opposed spring members.

6. Means according to claim 1 or 2, in which said spring means comprises a leaf spring.

7. Means according to claim 1 or 2, in which said spring means comprises a tension or compression spring.

8. Means according to claim 1 or 2, in which said drive means includes a motor.

9. A method for achieving cyclic displacement of a mechanical system which is displaceable between a pair of end positions, in a camera comprising the steps of:

(a) biasing said system towards a neutral position between said pair of end positions;

(b) retaining said system at one of said two end positions;

(c) releasing said system from said one of said two end positions;

(d) providing an additional force to said system when said system is between said end positions above that due to said biasing to insure that said system reaches the other of said two end positions;

(e) retaining said system at said other of said two end positions;

(f) releasing said system from said other of said two end positions; and (g) providing an additional force to said system when said system is between said end positions above that due to said biasing to insure that said system reaches said one of said two end positions.

10. A method according to claim 9, including releasing said system from each of said pair of end positions before each of said additional forces is provided.

11. A method according to claim 9, further comprising the steps of:

(a) monitoring said displacement of said system between said pair of end positions, and (b) controlling means for providing said additional forces in response to said monitoring to ensure that said system sequentially reaches said pair of end positions.

* * * * *